United States Patent Office 3,588,953
Patented June 29, 1971

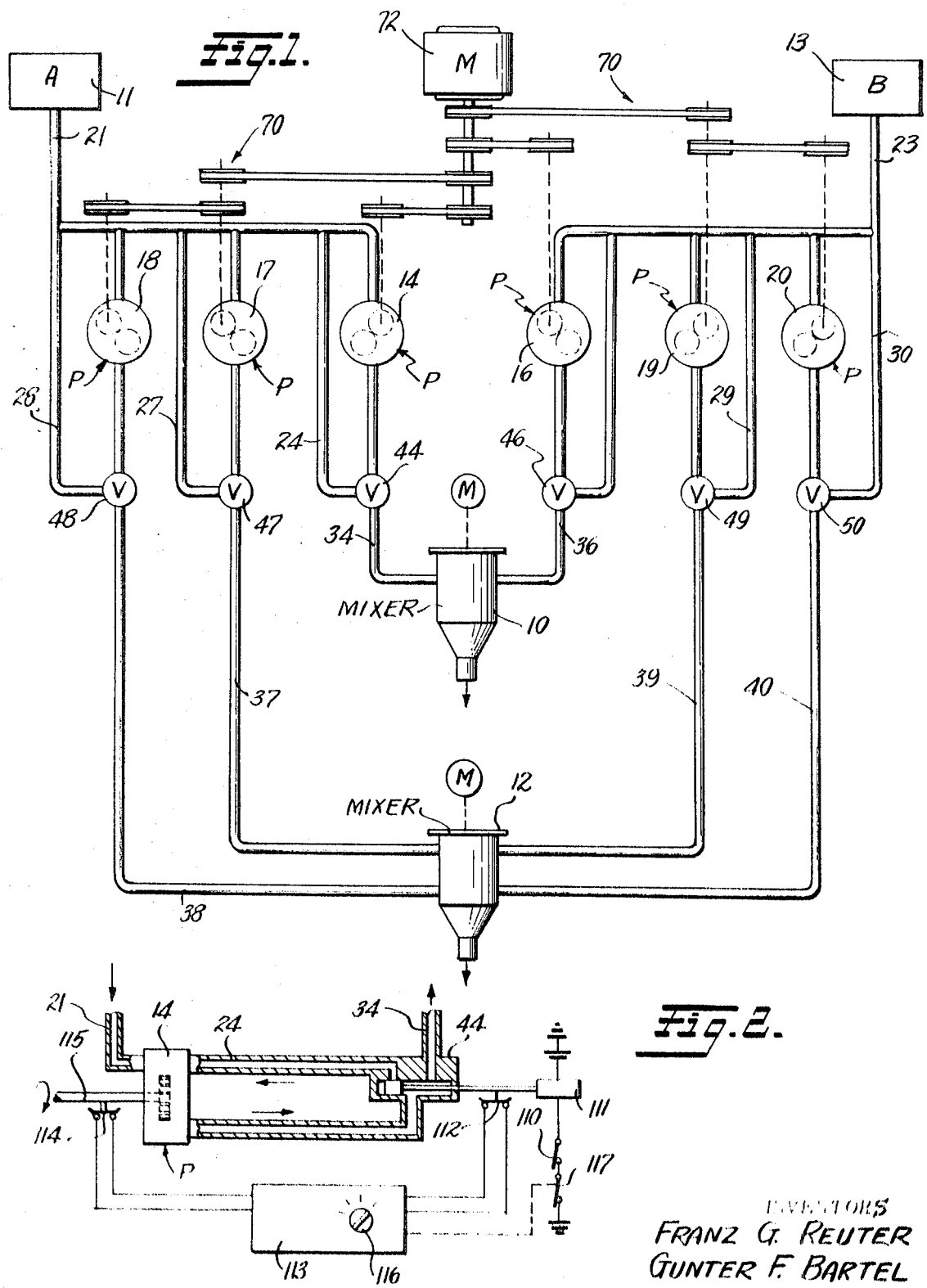

3,588,953
APPARATUS FOR MAKING PLASTIC FOAMS
Franz Gottfried Reuter, Hannover, and Gunter Friedrich Bartel, Tecklenburg, In den Lehmen, Germany, assignors to Elastomer A.G., Chur, Switzerland
Filed Mar. 6, 1968, Ser. No. 710,903
Claims priority, application Germany, Mar. 8, 1967, E 33,545
Int. Cl. B29c 1/00
U.S. Cl. 18—5   8 Claims

ABSTRACT OF THE DISCLOSURE

An apparatus for making plastic foams having a plurality of means for mixing components of a foamable reaction mixture together, each mixing means being connected to each supply of components by its own metering pump or pumps, all pumps of the apparatus being driven at the same speed for the same period of time while charging components to the mixing means so that any variation of volume of components is effected by the size of the pump.

---

This invention relates generally to an apparatus for making plastic or synthetic resinous foams and more particularly to an improved apparatus for mixing the components of a foamable reaction mixture in accurately controlled amounts.

Plastic or synthetic resinous foams are prepared by mixing together two or more chemical components which react together to form a synthetic resin while entrapping gas bubbles which impart a porous or cellular structure to the product. The reaction time of the chemical components is very short usually in the order of seconds or at most minutes so a mixing device capable of forming a substantially uniform mixture of the components substantially instantaneously before discharging it into a suitable mold must be used to avoid premature solidification in the mixing device. One mixing device of this type particularly well suited for mixing fluid components and discharging a foamable polyurethane reaction mixture into a mold is disclosed in U.S. Patent Re. 24,514.

In practice the components of a foamable reaction mixture are stored in tanks either individually or sometimes in pre-mixes of some of the components, particularly those which will not react together. These components are drawn from the storage tanks and fed into the mixing device by means of metering pumps. It has been the practice in the past to construct a continuous production line in which a plurality of molds are charged with reaction mixture, the resulting solidified product discharged therefrom and automatically moved again into position below mixing devices for recharging with reaction mixture. These production units are provided with a plurality of mixing devices all connected to one metering pump per component charged thereto. The mixing devices are actuated when a mold comes in contact therewith and inject a predetermined volume of mixture into each mold. Since the components pumped into the mixing device are prone to sedimentation or separation into phases particularly when the liquid being pumped is a pre-mix of non-reactive components, means is provided for the mixing device to be by-passed while it is not needed to fill a mold and to circulate the liquid in a circuit between the storage tank and mixing device in order to avoid a period of quiescence with settling of the liquid into two or more phases.

It has been found in practice that it is very difficult if not impossible to meter accurately the components supplied to the mixing device with the heretofore available apparatus wherein all mixing heads of the molding line are supplied by the same metering pump. Thus, if several mixing devices are connected to the same metering pump delivering each component of the resulting foamable mixture, the volume of component intended for all the mixing devices will not be uniformly distributed among the branchlines leading to the individual mixing devices, so that the volume of component injected will vary from one mixing device to the other. Variation in volume of components delivered to the mixing device causes variation in composition of the resulting mixture and variation in physical properties of the molded foam products.

It is therefore an object of this invention to provide an apparatus devoid of the foregoing disadvantages. Another object of the invention is to provide an improved apparatus for mixing the components of a foamable reaction mixture. Still another object of the invention is to provide an apparatus for mixing the components of a foamable reaction mixture together and injecting it into suitable molds which repeatedly produces a mixture of accurately controlled composition. A still further object of the invention is to provide an apparatus for mixing simultaneously the components of a fluid foamable reaction mixture with a plurality of mixing devices which is more flexible and more easily manipulated than heretofore available apparatuses and processes and permits the simultaneous preparation of mixtures having exactly the same composition in all the devices or permits the preparation of mixtures of different composition in selected mixing devices of the production system.

Other objects will become apparent from the following description with reference to the accompanying drawing in which FIG. 1 illustrates, schematically, an embodiment of an apparatus equipped with two mixing devices fed with components of a foamable reaction mixture from two storage tanks; and FIG. 2 illustrates, schematically, an embodiment of a metering and circulating portion of an embodiment of the apparatus of this invention.

The foregoing objects and others are accomplished in accordance with this invention, generally speaking, by providing an apparatus having a plurality of mixing devices each connected to at least two different sources of supply of chemical components of a foamable reaction mixture wherein each mixing device is provided with its own pump and metering system for each component charged thereto and all the pumps are driven at the same speed and inject into the mixing device for the same period of time so that any variation in volume of each component supplied to the mixing device is caused by a difference in the size of the pumps used. In other words, the apparatus provides a means for injecting accurately metered volumes of liquid into the mixing device by operating all of the metering pumps at the same speed and for the same period of time and providing pumps of different size when more of one component than the other is required or where it is desired to prepare simultaneously mixtures of different composition in the various mixing devices. In one preferred embodiment, all of the metering devices are driven by the same drive.

Any suitable metering pump may be used such as, for example, an injection pump including a Bosch pump. In one embodiment, the metering feed pumps are driven at the same speed and the injection period of each pump into the mixing device is the same but the size of the pumps is varied when the volume of one component in the resulting mixture is to be greater than that of another. In accordance with another embodiment of the invention all of the metering pumps are driven by the same motor across a reduction gear, the output of each pump being determined by the size of the gear wheel which can be changed to a different sized one when a change in output is required.

The changing of gear wheels in some instances may be undesirable because the production line must be stopped while the change is being made. Furthermore, it is sometimes desired to inject one volume of a component one time or a series of times in a mixing device and to change rapidly to a different volume for the next time or next series of times. Under these circumstances it is often most economical and convenient to connect a plurality of metering pumps between the supply source and the mixing device with the pumps varying from one to the other in size. Then, in this embodiment of the invention, the volume of component injected into the mixing device is changed by switching from one pump to the other. With this arrangement, the use of two metering pumps of different sizes between each of two component sources makes it possible to prepare four different mixture formulations by changing the combination of pumps. While it is possible to determine the volume of component delivered to the mixing device in a given cycle by proper setting of the delivery period, it must be understood that the delivery period of one component must not extend beyond the delivery period of the other components or the ratio of components in the resulting mixture will vary during the mix and injection cycle. This is why the ratio of components in the mixture is to be determined only by way of the pump size or speed, while each pump supplying the various components must supply the mixing device with its proper volume of component simultaneously with the others and for the same period of time.

In all embodiments of the invention each pump is supplied with its own conduit system for circulation of the component it is pumping during the period when it is not injecting into the mixing device. A diverter valve is used to direct flow into the circulating conduit or the mixing device as required. When it is desired to change rapidly from one ratio of components to another, it is convenient to furnish more than one metering pump of different size per component to each mixer, drive all the pumps with the same motor, and effect the change in ratio of components in the mixer by changing from one pump discharge to the other. This can be done by running all the pumps at the same time, and delivering the discharge of only the correct one to the mixing device while recirculating the discharge of the other pumps. A common motor drive for all the pumps has the advantage that fluctuations in the speed of the pump because of any extraneous means such as fluctuations in the power source will effect all the pumps in the same proportion. Consequently, the mixing ratio does not deviate. In order for the total volume of component not to deviate, the number of revolutions of the pump shaft is used to determine the volume metered by the pump into the mixer instead of depending upon the delivery period for this purpose. Hence, variations in motor speed do not adversely effect the ratio of components in the mixture.

The ability to switch immediately from one ratio of components to another is particularly advantageous in making synthetic resins from mixtures having a reaction temperature near room temperature (about 20° C.). When using an apparatus of the type provided herein having more than one metering pump per component for each mixing device, it is possible to pour layers of different composition into the same mold by pouring one layer and then changing metering pump to provide the other layer having a different composition. The same mixer can be used to pour both layers, it only being necessary to change the mold top to provide space for the second layer.

Referring now to the drawing for a more detailed description of one embodiment of the invention, FIG. 1 illustrates a system having storage tanks 11 and 13 containing components of a reaction mixture A and B, respectively. Components A and B when making a polyurethane foam can be, for example, poly(alkylene ether) polyol or polyester and activator mix in 11 and organic polyisocyanate in 13. The composition of components A and B can be any suitable ones including the formulations disclosed in the prior art such as U.S. Pats. Re. 24,514, 2,850,464 and 3,154,606.

The apparatus of FIG. 1 has two mixing devices 10 and 12 of the type disclosed in Pat. Re. 24,514, each mixer having a stirrer driven by its own motor. Tanks 11 and 13 are also provided with stirrers capable of preventing settling of the contents of the tank into different phases or layers. Conduit 21 which should be as short as practical extends from tank 11 to feed and metering pumps 14, 17 and 18. Conduit 23 extends from tank 13 to feed and metering pumps 16, 19 and 20. The aforesaid conduits as well as others to be described hereinafter can be metal or suitable plastic pipe or tubing such as iron, stainless steel, copper, nylon or polyethylene. Lines 21 and 23 may be provided with filters to avoid clogging of the pumps. It is to be noted that lines 21 and 23 each branch into three branch lines to connect to the pumps. Obviously, in an apparatus of this type, the number of mixing devices can be increased and the number of pumps serving each mixing device can be increased as desired. Mixer head 10 is connected to tank 13 through metering pump 16 and to tank 11 through metering pump 14. Pump 16 discharges liquid B into circulation loop 26 and then through line 36 into mixer 10 or recirculates the liquid through loop 26 depending upon the position of diverting valve 46. Pump 14 discharges liquid A into circulation loop 24 and then through line 34 into mixer 10 or recirculates the liquid through loop 24 depending upon the position of diverting valve 44.

Mixer head 12 is supplied with component A by either pump 17 or 18 which draw from tank 11 through line 21 and discharge into circulation loops 27 and 28, respectively. Circulation loops 27 and 28 are provided with valves 47 and 48, respectively. The discharge from metering pump 17 is directed by valve 47 through line 37 into mixer 12 or recirculated through loop 27 depending upon the setting of valve 47. Likewise, valve 48 directs the discharge of pump 18 through line 38 into mixer 12 or recirculates it through loop 28. A similar arrangement is provided between tank 13 and mixer 12. Pumps 19 and 20 draw from tank 13 through line 23 and discharge into loops 29 and 30, respectively. Component B is discharged from pump 19 in metered amounts through valve 49 and line 39 into mixer 12 or recirculated through loop 29. Component B is discharged from pump 20 through loop 30 in metered amounts through valve 50 and line 40 into mixer 12 or recirculated in loop 30.

All of the pumps 14, 16, 17, 18, 19 and 20 are driven by the same motor 72 through the same drive train 70 having a gear system which determines the speed of the pumps. The pumps are shown schematically and are of a predetermined size which determines the relative volume of output of each pump since they are all driven at the same speed. For example, pumps 17 and 18 will be of different sizes as will pumps 19 and 20 so they will deliver different amounts of components A and B respectively, to mixer 12 per injection cycle. The relative size of pumps 14 to 16 and pumps 17 and 18 to 19 and 20 will be determined by the relative proportions of A and B in the foamable mixture prepared in mixers 10 and 12. Of course, mixer 10 could be supplied with either or both components A and B by more than one pump and additional mixers with corresponding metering pump systems could be connected to tanks 11 and 13.

Mixing devices 10 and 12 can be used to inject jointly and simultaneously into the same mold through two gates or, since they are independently controlled, they can inject simultaneously or successively into different molds. An apparatus of the type provided by the invention can be used to advantage in continuous operation with a conveyor line carrying molds into position for injection of foamable mixture because it can deliver different ratios of components to successive molds or even to the same mold and can charge molds of different size by provision of the correct number of pumps of the proper size. The more mixing devices provided the greater the flexibility in operation of the apparatus. The apparatus is particularly well adapted for automatic operation because each injection cycle into a mold is triggered by contact between the mixer and mold.

It should be pointed out that, particularly in processing cold-foaming plastics, the mold costs are much lower than the cost of the mixers, so that it is more advantageous to get maximum use out of the injection and mixing apparatus than the molds. As a rule, the molds move on a circular conveyor system so that immediately after stripping the foam product from the mold, the mold moves back into position under a mixing device for another injection of foamable mixture.

Referring now to FIG. 2, more detail of the pump and discharge loop, using pump 14 as an example, is shown, partially in section. Metering pump 14 draws component A through branch line 21' of line 21 and discharges it in the direction of the arrow into loop 24. Diverting or reversing valve 44 opens and closes in response to limit switch 110. Valve 44 is shown in the open position or, in other words, in position for the pump discharge to pass through line 34 into mixer 10. When mixer head 10 contacts the mold to be charged with foamable mixture, limit switch 110 is closed and valve 44 is actuated across magnetic valve 111 or a corresponding servomotor so as to close the entrance to the conduit of loop 24 and divert discharge of mixture from constantly running pump 14 into conduit 34 and then into mixer 10. The valve slide simultaneously actuates a contact 112 which frees the input of a pulse counter 113. Pulse counter 113 is fed with pulses produced by means of a contact-breaker point 114. Contact breaker point 114 is actuated once during each revolution of the drive shaft 115 of pump 14. Pulse counter 113 has a setting device 116 for preselection of the counting total. When the preset total count is reached, an output pulse is produced and actuates a circuit breaker 117 for the exciter circuit of the reversing valve, or trips a solenoid which returns the valve slide to its rest position closing line 34 and terminating the injection into the mold. The other pumps, circulating loops and valves of the apparatus are similarly actuated. Of course, more than two components can be charged to a mixing device with similar pumps, circulating loops and valves provided that at least one pump per component is supplied for each mixer as described hereinbefore with reference to two components.

As indicated hereinbefore, the prior art practice has been to use only one pump per component to supply all of the mixing devices of a production unit. In other words, a system similar to that of FIG. 1 would have only one pump between tank 13 and mixers 10 and 12 and only one pump between tank 11 and mixers 10 and 12.

Although the invention has been described in considerable detail for purposes of illustration it is to be understood that such detail is solely for this purpose and that variations can be made by those skilled in the art without departing from the spirit and scope of the invention except as limited by the claims.

We claim:
1. An apparatus comprising means for storing separately at least two liquids which when mixed together will react to form a polyurethane foam, at least two mixers adapted to mix liquids together independently of each other, one conduit for each liquid extending between each storage means and each mixer adapted to conduct liquid therethrough only to one mixer, means for moving liquid through each conduit comprising a separate metering pump connected to each conduit, means for driving all of said pumps at the same speed and for the same duration of time, and means for discharging the resulting mixture from each mixer into a mold.

2. The apparatus of claim 1 comprising a valve positioned on each conduit between the pump and the mixer, a second conduit extending from the valve back to the suction side of the pump, and means for turning the valve to divert liquid flow from into the mixer to the said second conduit.

3. The apparatus of claim 1 wherein a plurality of pumps each having a different volume from that of the other are connected to each of said conduits.

4. The apparatus of claim 2 wherein each valve is actuated by a limit switch on the mixer associated therewith when the switch is contacted by a mold as it moves into position adjacent said mixer to receive liquid therefrom, a pulse counter having an input circuit, a contact breaker point actuated once by each revolution of the drive shaft of a pump charging liquid into the mixer and adapted to feed pulses to said pulse counter, means for setting a total number of pulses, a circuit breaker responsive to an output generated after said total pulse count is reached which actuates said valve to direct the flow of liquid into said second conduit.

5. The apparatus of claim 1 wherein all of the pumps are driven by one motor.

6. The apparatus of claim 1 having more than one mixing device adapted to discharge liquid simultaneously in the same mold.

7. The apparatus of claim 1 wherein said pumps are all driven by the same motor through a gear system adapted to change from one gear size to another.

8. The apparatus of claim 1 wherein at least one of said mixers has at least two metering pumps in at least one of said conduits, said pumps being of different but predetermined size, whereby the volume of component charged to a mixer can be changed by using one pump in preference to the other.

References Cited

UNITED STATES PATENTS

| | | | |
|---|---|---|---|
| 3,174,184 | 3/1965 | Calaway | 18—85C |
| 3,176,342 | 4/1965 | Davis | 18—85C |
| 3,204,290 | 7/1965 | Crompton | 18—85C |
| 3,203,042 | 8/1965 | Axelsson | 18—5PX |
| 3,242,240 | 3/1966 | Tantlinger | 18—5PX |
| 3,264,067 | 8/1966 | Alderfer | 18—5PX |
| 2,265,784 | 8/1966 | Jacobs | 18—5PX |

J. M. MEISTER, Primary Examiner